Aug. 14, 1934. L. A. COSTIGAN Re. 19,269

TYPE BINDING MEANS

Original Filed Dec. 15, 1932 2 Sheets-Sheet 1

Inventor

L. A. Costigan

By Clarence O'Brien

Attorney

Aug. 14, 1934. L. A. COSTIGAN Re. 19,269

TYPE BINDING MEANS

Original Filed Dec. 15, 1932 2 Sheets-Sheet 2

Inventor

L. A. Costigan

By Clarence O'Brien

Attorney

UNITED STATES PATENT OFFICE 19,269

TYPE BINDING MEANS

Laurence A. Costigan, Philadelphia, Pa.

Original No. 1,932,336, dated October 24, 1933, Serial No. 647,438, December 15, 1932. Application for reissue May 10, 1934, Serial No. 725,005

3 Claims. (Cl. 276—40)

This invention relates to novel and improved means to facilitate and effectively bind a so-called page of type.

Briefly stated, the preferred embodiment of the invention utilizes a gummed or equivalent binding tape adapted to surround the marginal portions of the page of type in such a way as to permit the free end portions of the tape to be secured together, together with means built into a galley to facilitate maintenance and handling of the tape.

The invention affords a simple, practical and economical means which is destined to replace make-shift cords and strings such as are now frequently utilized to temporarily bind or hold together a page of type prior to its being secured in the printer's chase.

In carrying the principles of the inventive conception into actual practice, I have evolved and produced an assemblage of features providing a structure which is efficient in performance, positive and dependable in action, practical and otherwise satisfactory in accomplishing the desired results in a satisfactory manner.

More specifically stated, the predominating feature of the invention is founded on the adoption of a relatively wide band-like tape which is adapted to embrace a page of type to facilitate handling it, together with means to aid in accommodating and expediting the placement of the binding tape.

Secondly, novelty is predicated on the tape accommodation means which, in its preferred form, constitutes a stationary part of a conventional galley. Otherwise stated, in order to permit the tape to be successfully employed, I contemplate the adoption of a refined or improved galley.

Although the preceding paragraph carries the implication that the tape accommodation means constitutes a part of a galley, I desire it understood that the tape accommodation means need not necessarily be a part of the galley, but may be made and sold separately as an individual unit for those printers who do not desire to purchase a complete galley.

Other features and advantages of the invention will become more readily apparent from the following description and drawings.

Figure 1:
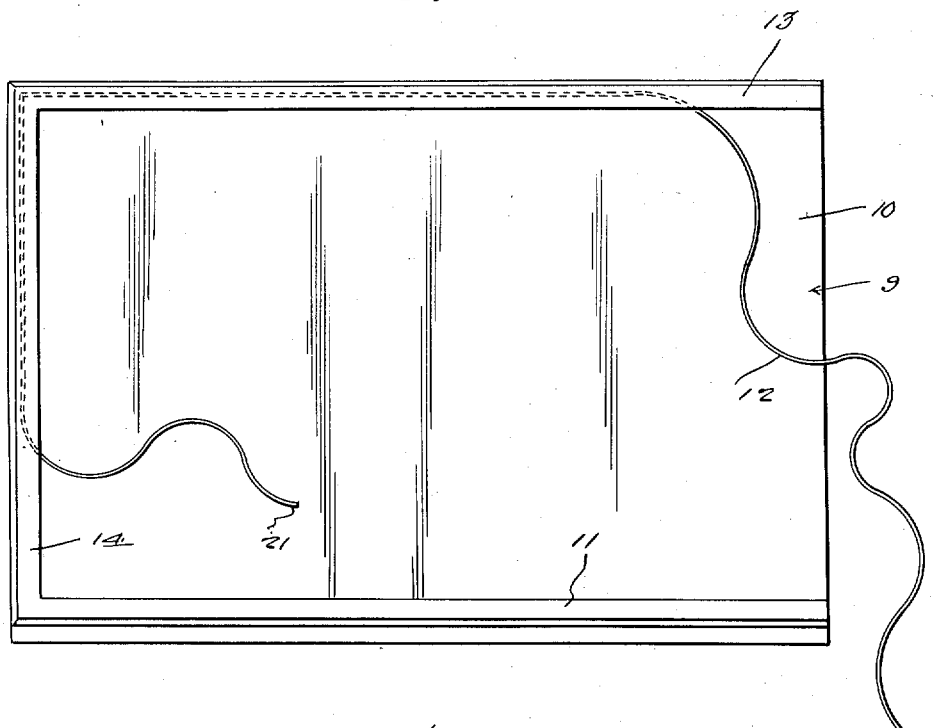
Figure 1 is a top plan view of a galley improved in accordance with my ideas and showing the manner in which the tape is inserted to facilitate wrapping of the tape around the type after the page of type is set and ready for transfer to the printer's chase.
Figure 2:
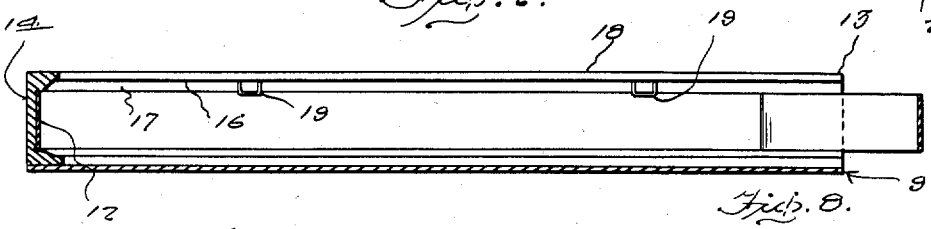
Figure 2 is a central longitudinal sectional view through the structure seen in Figure 1.
Figure 8:
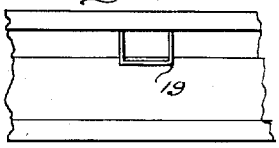
Figure 8 is a view showing how spring retaining clips may be employed to aid in securing the tape against displacement while the type is being set in the galley.

In Figure 1 I have shown what appears to be a regulation or conventional galley, the same being generally designated by the numeral 9 and including a base plate 10 provided along one longitudinal edge with a reinforcing or stabilizing rail 11. The L-shaped holding means for the tape 12 actually co-operates with the rail 11 in forming a type-confining rim, and the bar portions of this rim are distinguished by the numerals 13 and 14 respectively.

Figure 6:
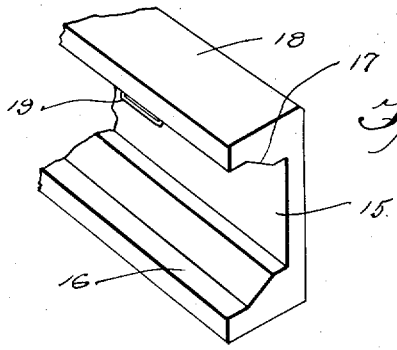
Figure 6 is an enlarged fragmentary perspective view of one end portion of one of the tape holding bars.

These bars differ from conventional rim bars in that the inner faces thereof are formed with grooves. The first groove, that is, the outermost groove is relatively narrow and denoted by the numeral 15 in Figure 6. This is the groove in which the band-like tape is seated and held until the page of type is completed. Then there is a second groove 16 which may be designated as a clearance groove into which the binding tape is moved so that it may be intimately bound around the marginal portions of the page of type. The numeral 17 merely designates bevelled surfaces which function as webs joining the grooves 15 and 16 together and to facilitate the easy placement of the tape in the groove 15 without permitting tearing.

In practice, it is contemplated providing the upper flange 18 at longitudinally spaced points with resilient retaining clips 19 of appropriate form which clips project down into the groove 15 to engage the upper edge portion of the tape to temporarily prevent accidental displacement of the tape to interfere with the type-setting operation.

Manifestly, by proportioning the groove 15 to permit the tape to fit snugly therein, these clips 19 may well be omitted.

Figure 7:
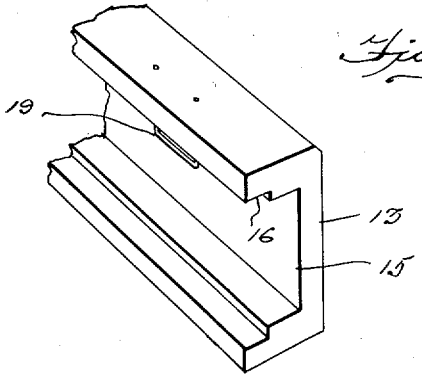
Figure 7 is a similar view of a modification showing grooves of a slightly different style.

So far as the modification in Figure 7 is concerned the same fundamental principle is carried into effect and the same reference characters are employed to designate the corresponding grooves. The only difference here is that the bevelled junc- 5 ture or tape feeding surfaces 17 are omitted. As a matter of fact, the cross sectional shape of the grooves is more or less immaterial so long as the fundamental idea of the inner and outer grooves 15 and 16 is provided.

Before describing the use of the invention, I wish to repeat that I prefer to utilize the means 13 and 14 as a part of the galley 9 as shown in Figure 1. At the same time, it is possible to use these features alone to provide an L-shaped unit 15 which can be made and sold separately in cases where the printer does not wish to purchase the complete galley.

Figure 3:
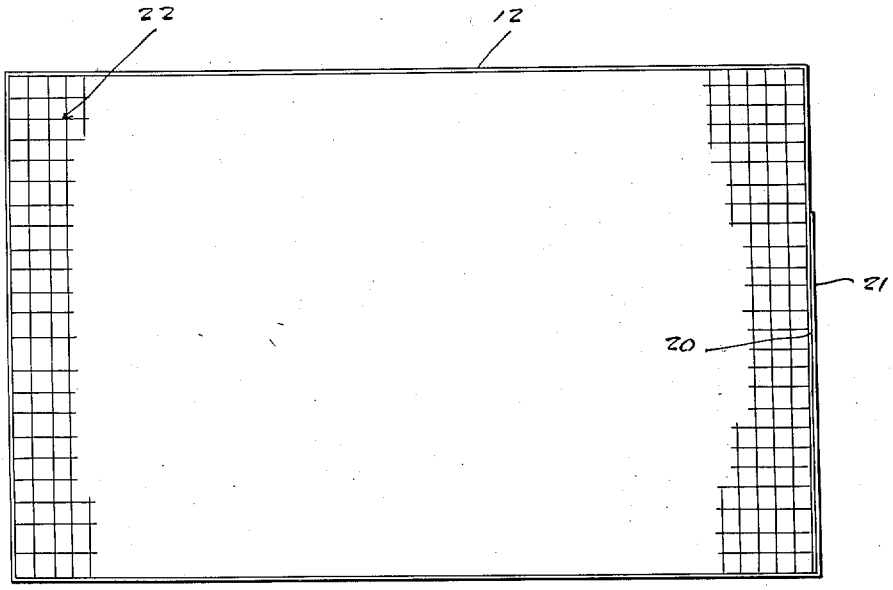
Figure 3 is a top plan view of the page of type with the retention binding tape in position.
Figure 4:
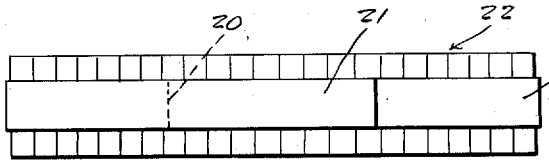
Figure 4 is simply an end view of Figure 3 observing it in a direction from right to left.
Figure 5:
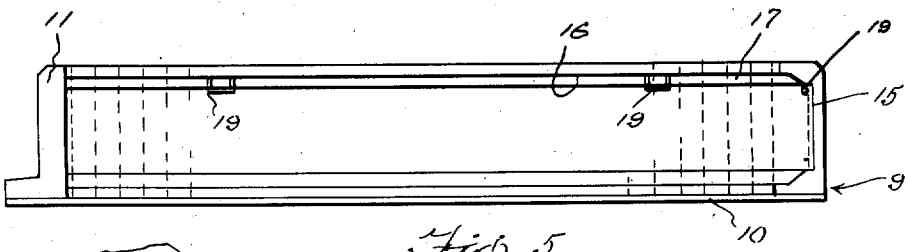
Figure 5 is an end view of Figure 1 observing said figure in a direction from right to left.

In practice, this so-called L-shaped retaining means functions primarily as a temporary holder in which the tape is inserted, leaving the ends of the tape free so that they can be brought around the complete bank or page of type to allow the ends 20 and 21 to be secured together in overlapping relationship as shown in Figures 3 and 4. In these figures the page of type is denoted by the numeral 22.

When the type page is moved from the galley to the stone slab for placing in the form or "lock-up", the tape stays around the page, and the page remains intact and unmoved while it is locked up. The tape binding effects no preceptible variation therein when the type is put in the press. The tape is not removed from the page of type until said type is "dead" or ready for distribution. Obviously then there is a saving of time by this method, one operation replacing the now familiar operations of tying and untying on the stone.

As the tape is made of comparatively thin material, the slack which is made by squeeze from the "lock-up" will be taken up by hugging in the spaces between the type lines (however small), and this will do away with the much abused habit of placing card strips alongside type pages to aid in "lifting" ill-spaced lines. Past experience has shown that this "slack" has given considerable trouble in this class of inventions.

As before implied, the gist of the invention is in the provision of a relatively wide light-weight band-like binding tape of a length to permit it to completely embrace the page of type with sufficient material to allow the ends of the tape to be overlapped and securely fastened together; together with an L-shaped holder for the tape wherein said holder is made up of right angularly disposed bars having outer relatively narrow grooves in which the tape is seated and held by clips, if desired, and inner relatively wider grooves into which the tape is drawn for clearance to facilitate binding.

Again, I say that the L-shaped holder for the 80 tape may well be built in as a part of the rim of a conventional galley to add to the practicability of the invention.

It is thought from the foregoing description that the advantages and novel features of the 85 invention will be readily apparent.

It is to be understood that changes may be made in the construction and in the combination and arrangement of the several parts provided that such changes fall within the scope of the 90 appended claims.

I claim:

1. As a new article of manufacture, a binding tape holder comprising a substantially L-shaped device embodying right-angularly disposed bars, 95 the inner faces of said bars being formed with relatively narrow tape seating grooves, said grooves corresponding in width to the width of the tape, and resilient retaining clips carried by said bars and depending into the upper edge 100 portions of said grooves for releasable engagement with the tape.

2. As a new article of manufacture, a binding tape holder comprising a substantially L-shaped device embodying right-angularly disposed bars, 105 the inner faces of said bars being formed with relatively narrow tape seating grooves, said grooves corresponding in width to the width of the tape, and resilient retaining clips carried by said bars and depending into the upper edge 110 portions of said grooves for releasable engagement with the tape, the inner faces of said bars being formed with additional larger grooves in registration with said first-named grooves, the second-named set of grooves affording clearance 115 space into which the tape is moved to facilitate placement thereof.

3. Tape type binding means comprising right angularly disposed bars in respect to an inner face of which type is positionable into page form, 120 and said inner face provided with a groove having an outer width narrower than the tape, and an inner width wider than the tape, said narrower groove serving to hold the tape while the page form of the type is completed and said 125 wider groove providing clearance into which the tape is movable in respect to the assembled type to facilitate binding the page of type and securing the ends of the tape together.

130

LAURENCE A. COSTIGAN.

60

135

65

140

70

145

75

150